Aug. 2, 1927.

M. P. CULLINAN

GLARESHIELD FOR HEADLIGHTS

Filed March 27, 1926

1,637,895

Inventor
M. P. Cullinan,

By Clarence A. O'Brien
Attorney

Patented Aug. 2, 1927.

1,637,895

UNITED STATES PATENT OFFICE.

MICHAEL PATRICK CULLINAN, OF LAREDO, TEXAS.

GLARE SHIELD FOR HEADLIGHTS.

Application filed March 27, 1926. Serial No. 97,938.

This invention relates to a shielding means for application to automobile headlights, adapted to break the glare of the headlights in the eyes of an approaching driver.

An object of this invention is to interpose an opaque member on the surface of the reflector and the lenses of the headlight of an automobile, so as to prevent reflection of light from the source of the light and in addition to intercept the light projected direct from the lamp throughout a predetermined sector in such a combination that it will break the rays of light usually reflected into the eyes of an approaching driver producing an unnecessary glare that at the same time will permit the efficient projection of a light beam onto the road surface in front of the automobile equipped with the invention to adequately illuminate the roadway.

The invention further comprehends numerous other objects and advantages residing in the method and construction used for carrying out the features of this invention, which are more particularly pointed out in the following detailed description and in the claim directed to the preferred forms of construction, it being understood however, that various changes in the size, shape and arrangement of the parts may be made without departing from the spirit and scope of the invention as herein set forth.

In the drawing forming part of this application:

Figure 1:
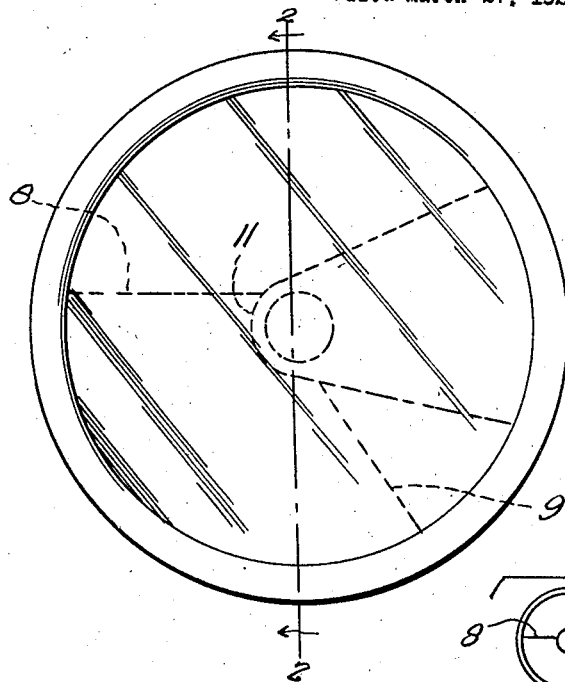
Figure 1 illustrates a front elevation of one headlight of conventional type, equipped with this invention, the invention being indicated in dotted lines.

The headlight illustrated which is of conventional form, and the construction of which is shown to merely indicate the application of the invention includes a housing 1 in which is mounted the flanged reflector 2, and with which is associated the rim 3 carrying the lens 4 for securing the flanged reflector and the lens on the housing in the usual manner well known in the art. The usual lamp 5 is mounted in the socket 6 extending through the central portion of the housing 1 and the reflector 2 and receiving suitable circuit connections so that power may be supplied to light the lamp. It is common practice to use the parabolic reflectors in these lights in order that the lamp 5 may be placed at the focus of the reflector to project a beam of light illuminating the road in advance of the motor vehicle.

It has been found that in vehicles employing these lamps, the lower portion of the parabolic reflector in numerous cases projects the light from the bulb 5, to the left hand side of the vehicle carrying the lamp, and slightly upwardly so that it will be projected directly into the eyes of an approaching driver, and produce the blinding effects common with automobile headlights.

In addition, the lights projecting directly from the bulb 5 through an upper left hand sector of the lamp also projects directly into the eyes of an approaching driver and increases this glaring effect, which makes it difficult for the approaching driver to see the road in advance of his machine.

This invention provides for the use of sectors of opaque material applied to the reflector and the lens throughout these sectors, of projection of the glaring light in the eyes of an approaching driver so that the reflected light and the projected light from the bulbs will be intercepted by these opaque sections.

Figure 3:
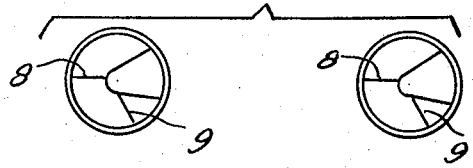
Fig. 3 is a diagrammatic view showing the relation of the two front headlights of an automobile and illustrating the positions of the sectors in each light.
Figure 2:
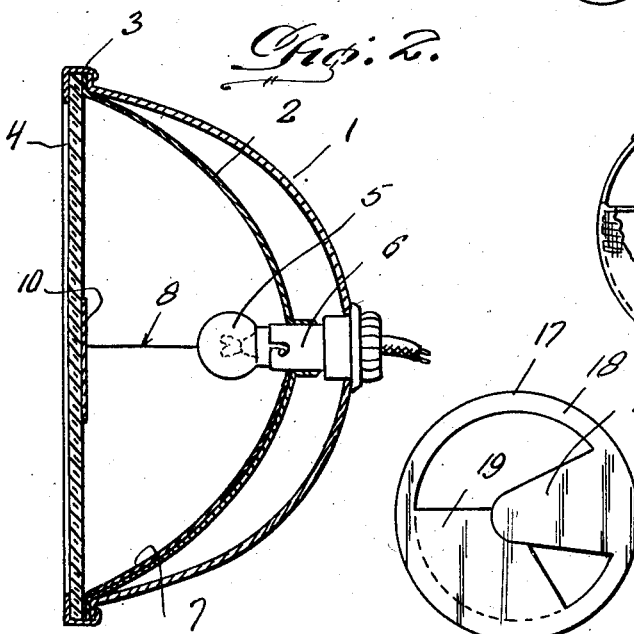
Fig. 2 is a vertical sectional view taken on the line 2—2 of Fig. 1, showing a conventional headlight structure with the invention applied thereof.

In carrying out this invention, an opaque sector of suitable material is indicated at 7 and is applied to the lower portion of the reflector 2 in which the upper edge as indicated at 8 extends radially substantially, and in a horizontal plane with the axis of the lamp 5, as clearly shown in Figs. 2 and 3, while the sector 7 covers an arc of approximately 135° so that the edge of the sector indicated at 9 extends across the vertical center of the lamp and terminates in inclined relation thereto as is clearly shown in Figs. 1 and 3. This applies to both headlights in that the position of the sectors is exactly the same as shown by Fig. 3.

A second sector of opaque material is applied to the inside of the lens 4 as shown at 10 in Fig. 2, which has the center thereof arranged at an angle of approximately 135° with respect to the center arm of the sector 7 so that the sector 10 will overlie the left hand side of the lamp as shown in Fig. 1, while the sector 7 overlies the lower right hand portion of the reflector. This sector 10 has an arc of substantially 45° and may be varied as desired in which the opposite edges are preferably arranged at an acute angle and the inner end terminating in a rounded portion as is indicated at 11, Fig. 1, which extends over the axis of the lamp 5.

This sector prevents the projection of the light by the lamp 5 upwardly and to the left of the lamp, so that the light projected toward an oncoming driver from the lamp directly, will be intercepted and shielded by the sector 10.

From this description, it will therefore be understood that this invention contemplates the provision of a pair of sectors on the reflector and lens respectively having a relative position with one another of such a character that they cooperate to exclude the projection of light above the horizontal plane of the lamp and to the left of the vertical plane in order to prevent the light from glaring in the eyes of an approaching driver. These sectors may be independently mounted or suitably attached to the reflector or the lens, and may be formed of any desirable material, suitable for the purpose, in order to provide an opaque or substantially opaque and nonreflecting surface in the lamp.

Figure 4:
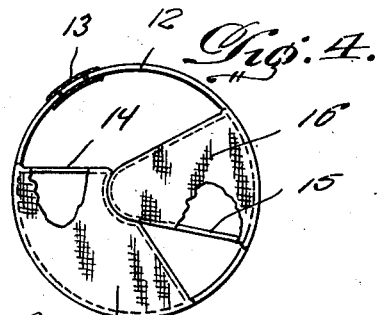
Fig. 4 is a front elevation of one type of shield member for use in carrying out the principle of this invention.

One manner of carrying out the application of this invention includes the provision of a construction as shown in Fig. 4 in which a split ring member is indicated at 12 having the free end slidably engaged in the free sleeve 13 to permit adjustment of the size of the ring member 12 to fit varying sizes of rims 3 of the headlight structure, while suitable supporting wires 14 are bent into the shape of the sector 7 and secured at the ends to the rim 12 in any suitable manner such as by welding, soldering, or the like.

Another wire member 15 is formed into the shape of the sector 10 and the ends also suitably secured in proper position on the ring 12 as is shown in Fig. 4, to provide a frame for the sector 10 carried by the ring 12. These sector frames 14 and 15 are then covered with suitable material such as cloth or the like as indicated at 16 which may be treated with any desired coloring material or finishing material desired to complete the shield structure.

Upon the completion of these shields, they may be suitably applied in the proper position as shown in Fig. 3 to the head lamps of an automobile by inserting the split ring 12 into the rims 3 in the rear of the lenses 4 and positioning the rings in assembled relation on the lamp body 1, which will hold the parts in position so that the sectors will be located in the position shown in Fig. 3 for performing their cooperating functions in intercepting and shielding the light projected upwardly into the left of the headlight, and thereby preventing the glare in the eyes of an approaching driver.

Figure 5:
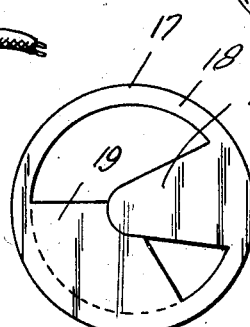
Fig. 5 is a front elevation of another type of shield member, adapted for use in carrying out this invention.

A construction as shown in Fig. 5 may also be mounted where the ring and both sectors are made in a single piece by molding, stamping or the like, by suitable sheet material or molded material, as indicated at 17 in which the ring or rim is indicated at 18, while the sectors formed integral therewith are indicated at 19 and 20 respectively. Any suitable form of opaque or semi-opaque material may be used and the shield constructed by pressing, stamping, molding or in any other suitable manner; and after the construction is completed as shown in Fig. 5 it may then be applied in the same manner as the construction shown in Fig. 4 to the lamp by placing it between the flange on the reflector 2 and the lens 4 and securing the rim 3 in place on the lamp housing 1.

From the above description, it should therefore be understood that a cooperating sector structure has been provided for automobile headlights, which will exclude the glaring lights of both lamps and in which the shields applied to both lamps are interchangeable, and which may be manufactured from numerous different materials well known in the art, which is suitable for the purpose at a substantially small cost, and in a convenient and simple manner.

Having thus described my invention, what I claim as new is:—

A shield for headlights comprising a pair of sectors, one of said sectors being formed to fit the reflector of the headlight with the opposite edges arranged in obtuse angular relation, the other sector being formed to fit against the lens of the headlight with the opposite edges arranged in acute angular relation, said sectors being mounted in said headlight with the radial centers positioned in obtuse angular relation whereby the objectionable light rays which project from the reflector and the lamp in the headlight may be excluded above the horizontal and to the left of the vertical plane of the lamp.

In testimony whereof I affix my signature.

MICHAEL PATRICK CULLINAN.